June 9, 1931.   R. T. GLASCODINE   1,809,198
CENTRAL BUFFING AND DRAWGEAR FOR RAILWAY VEHICLES
Filed Sept. 19, 1929
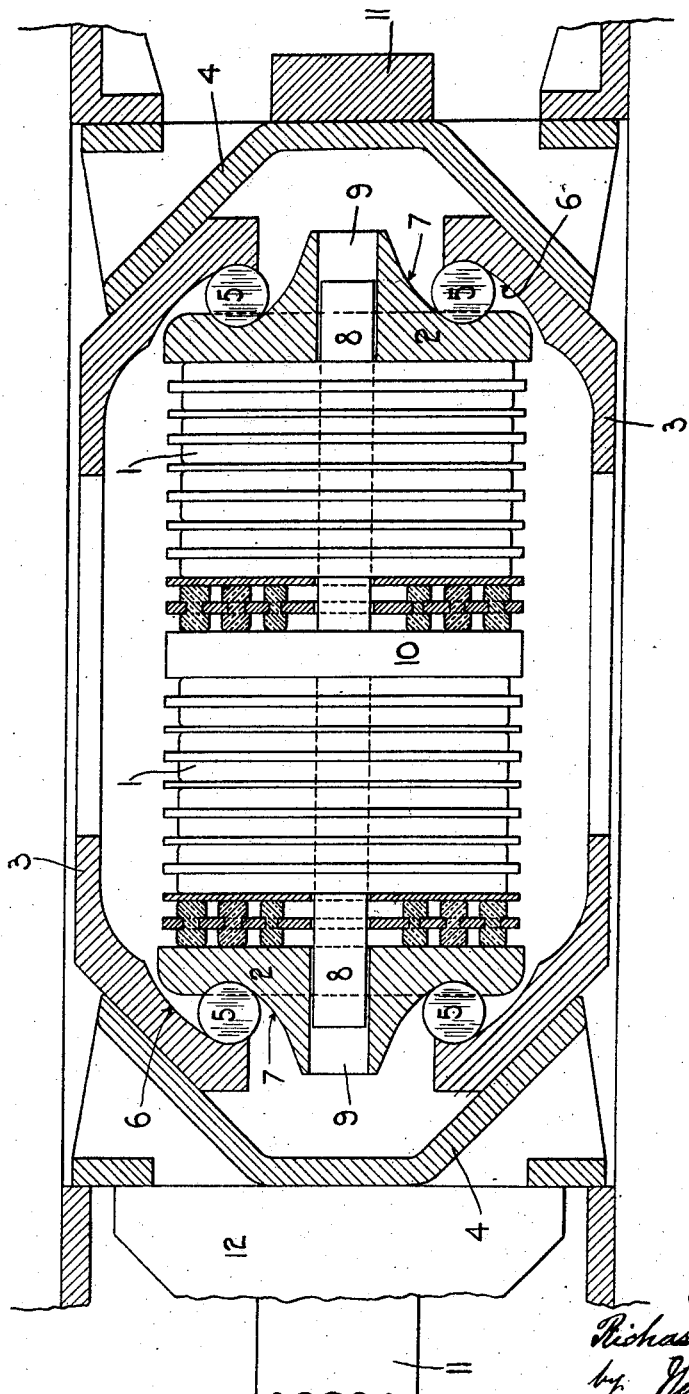
Inventor
Richard T. Glascodine
by Herbert W. Jenner,
Attorney.

Patented June 9, 1931

1,809,198

UNITED STATES PATENT OFFICE

RICHARD THOMSON GLASCODINE, OF LONDON, ENGLAND

CENTRAL BUFFING AND DRAWGEAR FOR RAILWAY VEHICLES

Application filed September 19, 1929, Serial No. 393,726, and in Great Britain July 19, 1929.

This invention relates to buffing and draw gear for railway vehicles. Particularly the invention has reference to improvements in frictional draft gear in which buffing and tension shocks transmitted through the couplers are absorbed and dissipated mainly by friction. As usually constructed frictional draft gear comprises springs, friction wedge members, spring casing, and follower plates embraced by a yoke secured to the shank of the coupler head.

The primary object of the present invention is to provide friction draft gear of enhanced cushioning and shock absorbing capacity.

According to the invention, the yoke embraced friction draft gear comprises end pressure plates with inclined faces, friction wedge members with inclined ends bearing on said faces, bearing plates for said wedge members, an axial rod freely carried by said bearing plates, and an india-rubber spring mounted on said rod between said plates and compressed longitudinally by the approach movement of said wedge members as a result of buff or draft strains.

Certain known constructions of frictional draw gear comprise side wedges that are forced towards each other against the action of a spring located between them by means of heads or followers that engage the ends of said side wedges. According to the present invention smoother working and increased efficiency is obtained by the employment of appropriately designed india-rubber springs located between the wedge members and compressed upon movement of the said wedge members towards each other. The india-rubber springs may be under any desired initial compression when the wedges are in their outer or normal position.

Preferably the india-rubber springs employed are of the well-known type comprising a column of spring units each consisting of a number of concentric rings or frames of india-rubber, or a number of suitably arranged bars of india-rubber, moulded on to both sides of a metal plate, the rings, frames, or bars of rubber at one side of said plate being connected to the rings, frames, or bars of rubber at the other side thereof by rubber that extends through perforations formed in the metal plate. Metal dividing plates are interposed between the several units arranged in column form to constitute the spring.

The invention is not restricted however to india-rubber springs made in this way as any other appropriate form of india-rubber spring may be used in the combination.

Reference will now be made to the accompanying drawing, which shows in sectional elevation friction draft gear according to the invention.

The gear shown comprises an india-rubber spring 1 of the kind described arranged between end bearing plates or cam plates 2 that are moved towards each other in order to compress the spring 1 by side wedge members 3 that are pressed towards each other upon operation of the gear by means of end pressure plates or follower plates 4. The side wedges 3 actuate the end plates or cam plates 2 by means of cylindrical rollers 5 that ride on suitably formed faces 6 and 7 of the members 3 and the end plates 2 respectively. The india-rubber spring 1 comprises a column of any desired number of spring units of the type before-mentioned.

To render the spring column stable and maintain the spring units in proper relative position the spring is mounted on a metal rod 8 extending axially through the spring 1 and the ends of which are mounted to slide in axial holes 9 formed therefor in bosses on the end bearing or cam plates 2 between which the spring 1 is arranged. In the example of gear illustrated the india-rubber spring 1 is separated into two parts by a flange 10 formed in one with or fixed to the centralizing and supporting metal rod 8. Each part of the spring 1 may, as shown, comprise the same number of units and as will be seen each said spring part is located between one of the end plates 2 and one face of the flange 10 on the centralizing rod. The metal plates of the spring 1 are formed with central holes through which the centralizing rod 8 can slide. The centralizing rod 8 may be made in two parts each screwed to a flange or plate that constitutes the mid-abutment member 10 for the two parts of the india-rubber spring 1. Instead of a rod 8 a tube may be employed to centralize and support the india-rubber spring. The said spring may be divided up into more than two parts if so desired, separated from each other by flanges or bearing plates formed or fixed on the centralizing rod. 11 indicates the yoke embracing the friction draft gear and 12 the follower plate at the front end of the gear.

What I claim is:—

1. In central buffing and draw gear, a draw bar yoke, and friction draft gear embraced by said yoke comprising end pressure plates with inclined faces, friction wedge members located between said end pressure plates and having inclined ends that bear on the inclined faces of said end plates so that the said members are caused to move towards one another upon movement of the said end plates towards one another, an india-rubber spring arranged between said friction wedge members, bearing plates located one at each end of said india-rubber spring, means whereby the said bearing plates are moved towards one another upon the said friction members being moved towards one another, and an axial rod supported at its ends by said bearing plates and upon which said india-rubber spring is mounted.

2. In central buffing and draw gear, a draw bar yoke, and friction draft gear embraced by said yoke comprising end pressure plates with inclined faces, friction wedge members located between said end pressure plates and having inclined ends that bear on the inclined faces of said end plates so that the said members are caused to move towards one another upon movement of the said end plates towards one another, bearing plates located between said friction members, an axial rod mounted at its ends in said bearing plates, a flange on said rod intermediate of the ends thereof, an india-rubber spring on said rod between the said flange and each of said bearing plates and means whereby the said bearing plates are moved towards one another upon the said friction wedge members being moved towards one another.

3. Yoke embraced friction draft gear comprising end pressure plates with inclined faces, friction wedge members with inclined ends bearing on said faces, bearing plates for said wedge members, an axial rod freely carried by said bearing plates, and an india-rubber spring mounted on said rod between said plates and compressed longitudinally by the approach movement of said wedge members as a result of buff or draft strains.

In testimony whereof I affix my signature.
RICHARD THOMSON GLASCODINE.